July 9, 1968 J. M. PARTRIDGE ET AL 3,392,003
LEACHING APPARATUS
Filed Dec. 16, 1963 3 Sheets-Sheet 1
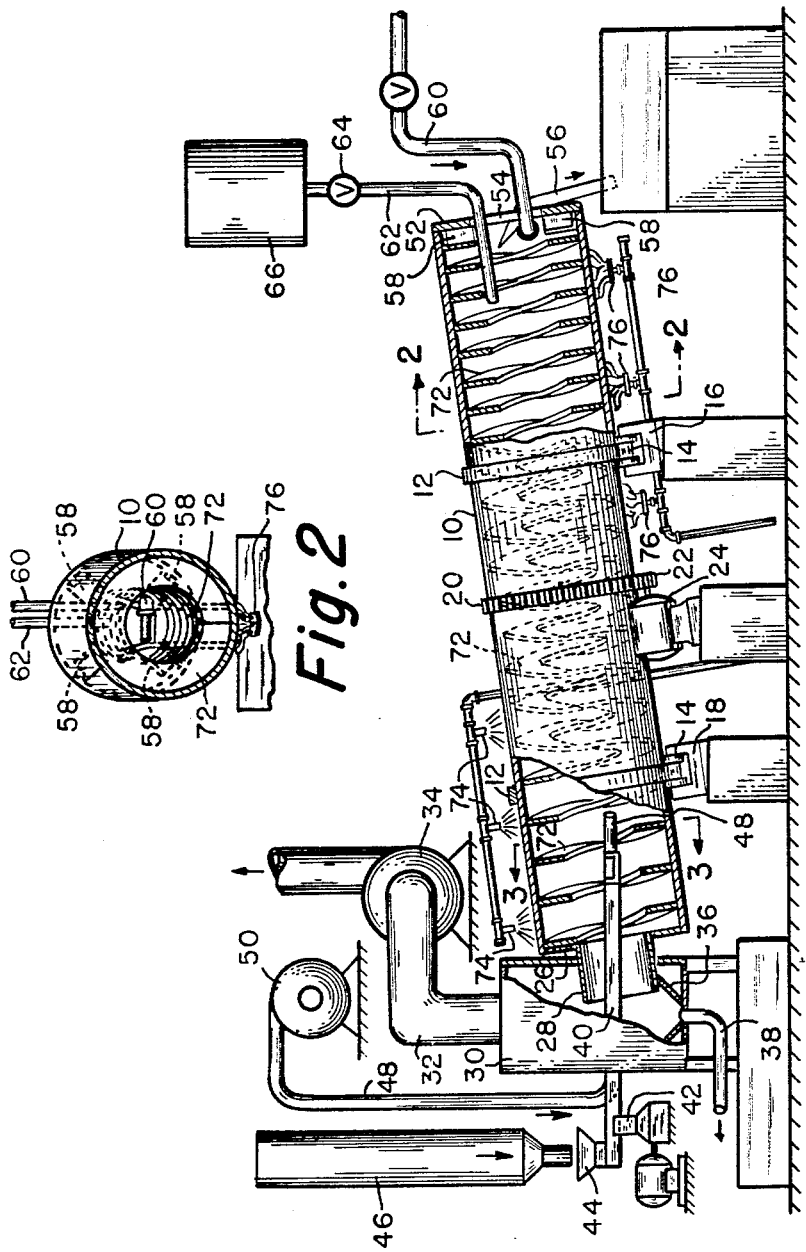
INVENTORS
James M. Partridge
Eldon R. Poulsen
John C. Priscu
Elbert C. Smith
BY
*Wahl, Burden, Robinson & Webb*
THEIR ATTORNEYS July 9, 1968   J. M. PARTRIDGE ET AL   3,392,003
LEACHING APPARATUS
Filed Dec. 16, 1963   3 Sheets-Sheet 2
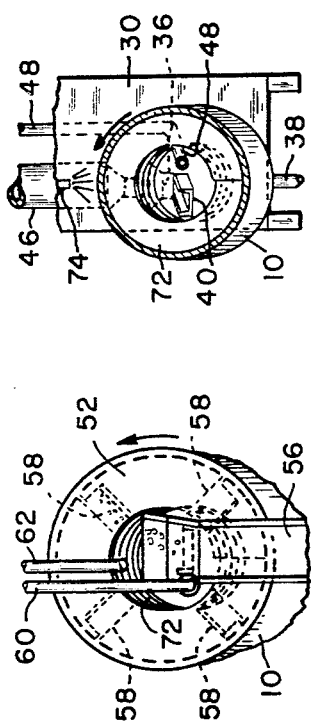
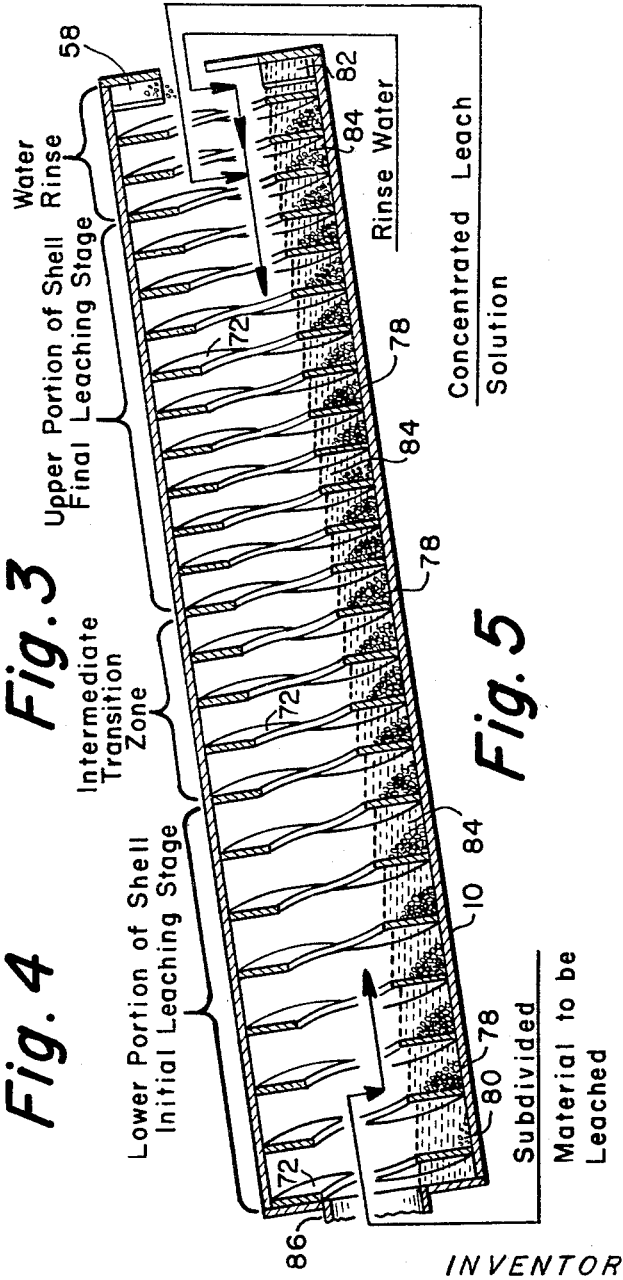
INVENTORS
James M. Partridge
Eldon R. Poulsen
John C. Priscu
Elbert C. Smith
BY
Webb, Burden, Robinson & Webb
THEIR ATTORNEYS

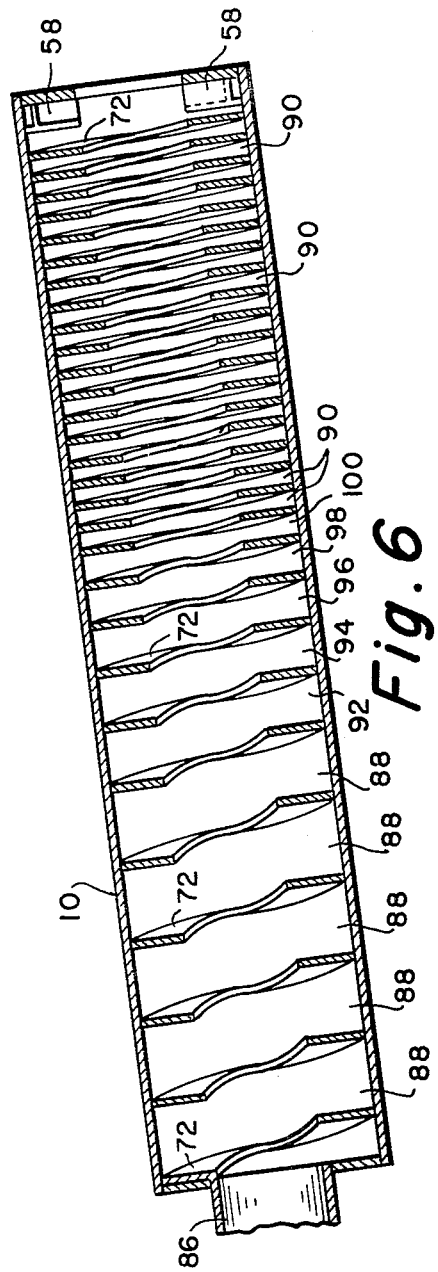

United States Patent Office 3,392,003
Patented July 9, 1968

3,392,003
LEACHING APPARATUS
James M. Partridge and Eldon R. Poulsen, North Las Vegas, John C. Priscu, Las Vegas, and Elbert C. Smith, Henderson, Nev., assignors to Titanium Metals Corporation of America, New York, N.Y., a corporation of Delaware
Filed Dec. 16, 1963, Ser. No. 330,823
11 Claims. (Cl. 23—270)

ABSTRACT OF THE DISCLOSURE

Apparatus for leaching including an angularly oriented elongated shell rotatable about its longitudinal axes and having a continuous spiral affixed to its inner surface with adjacent convolutions of said spiral being closer at the upper end of the shell than at the lower end and means for supplying material to be leached at the lower end of the shell and means at the upper end of the shell for supplying leaching solution and means for withdrawing leached material.

---

This invention relates to apparatus for leaching metals, ore, concentrates, or the like, to remove impurities or unwanted constituents.

Metals, ores and concentrates are often leached with various solutions during ore treatment or metal purification. An example is the leaching of subdivided titanium metal sponge with an acid solution to separate excess metallic reducing agent and by-product chloride salts. Such a leaching operation can be conducted by contacting a batch of impure sponge with suitable acid in a container, thus dissolving the impurities, and subsequently removing the acid solution and rinsing the sponge with water to produce a purified product. Batch treatment, however, is slow, uneconomical and difficult to control.

Continuous leaching treatment can be accomplished in apparatus which basically conveys the material to be leached in one direction and provides leaching solution contacting such material and flowing in a direction opposite or countercurrent to the direction of travel of such material. In this manner, impure feed material initially contacts solution which is almost spent, while as it travels along the conveyor, it comes in contact with stronger and fresher solution. A conveyor fabricated as an elongated tube having interior flights in the form of a continuous helix or spiral can be arranged to function in such a system to provide countercurrent feed material and acid travel. Considered in conventional embodiment, such a conveyor is characterized by several serious disadvantages when employed for the purpose herein considered. We have found that the reaction near the outlet end of the apparatus is slow and inefficient, while the reaction near the inlet end, that is where the feed material is introduced, is violent and often difficult to control. Particularly when an acid solution is employed, for example, to leach titanium sponge, the feed material will react rapidly with the acid near the inlet, even though it may be of low concentration, resulting in frothing, agitation and generation of large amounts of heat. At areas near the outlet end, the reaction will be sluggish and inefficient while the acid solution at this stage remains cold. As a result, the output material is not effectively leached.

Another problem encountered in continuous leaching is disposal of gases generated in the apparatus. When acid is employed for leaching of metals or ores, hydrogen is often generated and this must be effectively removed to provide best reaction conditions and to avoid explosion hazard. Conventional suction fans to exhaust generated gases can provide considerable flow of cooling air or gas through portions of the apparatus which are already too cool and need conservation or addition of heat.

Summarized briefly, this invention provides method and apparatus useful for leaching which results in improved conditions for most efficient leaching including temperature control, and also provides efficient removal of generated gases without adversely disturbing or affecting leaching reaction conditions. This is accomplished by separating the material to be leached into uniform size portions and treating these portions successively and countercurrently with leaching solution. The leaching is carried on in a plurality of stages in which the ratio of leaching solution to material being leached, hereinafter referred to as the liquid to solids ratio, in an initial stage is from 2 to 5 times such ratio in a final stage. Preferably an intermediate stage is provided between such initial and final stages and the ratios of liquid to solids are graduated in such intermediate stage. After leaching, the leached material is rinsed with water. Apparatus for such leaching may comprise an elongated tube rotatably supported with its axis at an acute angle to the horizontal. A continuous spiral ribbon is arranged within the elongated tube with its outer edge attached in sealing engagement with the tube interior wall. The convolutions of the spiral ribbon form a series of open top compartments along the bottom of the shell through which leaching solution may flow downwardly from one to the other. Material to be leached may be conveyed upwardly countercurrent to the solution flow by rotation of the tube to produce Archimedean screw action. The distance between spiral ribbon convolution or flights is not, however, uniform over the length of the tube. In the lower, material feed portion of the tube, the convolutions are spaced apart a distance from 2 to 4 times the distance between convolutions in the upper portion of the tube. This in effect provides larger compartments in the lower portion of the tube and a greater liquid to solids ratio than in the upper portion. Thus, a larger amount of the weaker solution is brought into contact with each compartment load of material to be leached and this increases leaching efficiency and reduces frothing and deleterious effects of solution evaporation in the lower portion of the tube. In the upper portion of the tube, the convolutions of the spiral ribbon being spaced closer together, the compartments are smaller and the ratio of liquid to solids is reduced. The increased number of smaller compartments in the upper portion are advantageous to promote better separation and washing action and, since the solution in this area is strong and fresh, smaller amounts are effective for leaching efficiency. Intermediate the upper and lower portions of the tube, convolution separation distances are intermediate those in the upper and lower portions and are preferably graduated to provide smooth transition from the large lower compartments to the smaller upper ones.

With liquid to solids ratio controlled by compartment size, excess heat generated in the lower portion of the tube can be removed by cooling the tube, and heat may be added to the upper portion as by gas burners.

Removal of generated gases is accomplished by a novel arrangement in which air is pumped into the tube at a position spaced from the lower end, and this air plus generated gas is withdrawn by a suction fan ducted to the tube lower end. The suction fan capacity is somewhat in excess of the sum of the air pumped in and the generated gas so that a small but definite inflow of air is also maintained at the upper opening of the tube. At the same time, gases generated in the tube are effectively diluted (important if hydrogen is present) and removed, and air-flow in the tube lower section contributes to temperature control by cooling as a result of evaporation of solution.

The following more detailed description of this invention will be more readily understood by reference to the annexed drawings in which:

FIG. 1 shows a general side view, partly broken out, of apparatus embodying features of this invention.

FIG. 2 shows a vertical section of the leaching shell taken along the line 2—2.

FIG. 3 shows a vertical section of the leaching shell taken along the line 3—3.

FIG. 4 shows an end view of the upper portion of the leaching shell, particularly showing the action of the material discharge lifters.

FIG. 5 illustrates the leaching process of this invention diagrammatically, and shows progress of material being leached through various stages.

FIG. 6 shows an example in vertical section of a preferred type of leaching shell and illustrating the differences in compartment spacing in initial, intermediate and final leaching stages.

Referring now particularly to FIG. 1, the apparatus comprises an elongated tubular shell 10, preferably constructed of materials resistant to the action of acids or solvents which may be employed as leaching solutions. Shell 10 is rotatably supported at an acute angle to the horizontal by provision of encircling tires 12 which ride on support wheels 14 which are in turn rotatably mounted on blocks 16 and 18 to provide the proper elevation of shell 10 at the locations of tires 12. Ring gear 20 also encircles shell 10 and meshes with pinion 22 which is fixedly attached to the output shaft of electric motor 24, the shell 10 thus being rotatable at relatively low speed.

The lower end of shell 10 is provided with a partial closure 26 and a central extension or outlet 28. End housing 30 receives extension 28 and is also connected by duct 32 to suction fan 34. The bottom of extension 28 also serves as a lip for discharge of liquid from shell 10 into funnel 36 attached to pipe 38 through which spent leaching liquid may be collected and discharged to a drain, regenerated for further use, or otherwise disposed of. Passing through housing 30 and also through shell extension 28 is the output conveyor 40 of feeder 42 as will be seen in FIG. 3. The input 44 of feeder 42 is supplied with subdivided material to be leached from vertical bin 46. Also passing through housing 30 and shell extension 28 is air line 48 which is suitably connected to output of air compressor or blower 50.

The air introduced through air line 48 into the interior of shell 10 by action of blower 50 is withdrawn together with gases formed by leaching reaction through shell outlet 28 by action of suction fan 34. This effectively dilutes such gases (important if hydrogen is evolved by reaction of acid leaching solution with a metallic impurity) and clears them from the shell interior. Preferably the capacity of blower 50 to introduce air is from 70% to 95% of the capacity of the suction fans 34 so that ample evacuation of evolved gases and inflow through tubular shell end openings will be obtained.

The upper end of shell 10 is partially closed by end plate 52 leaving a central opening 54. Leached material collector 56 intrudes through aperture 54 with its mouth disposed to receive leached solids for discharge from shell 10 and which are transferred thereto by the action of lifters 58. The design of lifters 58 is more particularly shown in FIG. 4 and will be discussed in greater detail hereinafter.

Also intruding into shell 10 through aperture 54 is valved water line 60 preferably carrying preheated water whose output end is disposed close to the upper end of shell 10, as shown. Additionally, through aperture 54 passes acid feed line 62 whose output end within shell 10 is disposed longitudinally further inside shell 10 than the output end of water line 60. The feed of acid through acid line 62 is controlled by valve 64 from a suitable acid container or tank 66.

Shell 10 is provided with a continuous spiral ribbon 72 which has a plurality of convolutions whose outer edges are fixed or secured to the inner wall of shell 10 and sealed thereto as by welding. The convolutions of ribbon 72 form a series of open top compartments along the bottom of shell 10 as will be seen more clearly in FIG. 2. These open-top compartments are, however, not uniform in size from end to end of shell 10. In the lower portion of shell 10, the distance between adjacent convolutions of ribbon 72 is greater than and preferably from 2 to 4 times the distance between adjacent convolutions in the upper portion of shell 10, as may be seen particularly in FIG. 6. Between upper and lower portions of the shell 10 is a pitch transition zone characterized by distances between adjacent convolutions of ribbon 72 which are intermediate between the distances between those in the lower and upper portions. Preferably the distances between adjacent convolutions in the pitch transition zone of shell 10 are graduated with a more or less regular decrease from lower to upper end of this zone to provide a transition in steps between the larger compartments in the lower portion and the smaller compartments in the upper portion.

In the lower portion of the shell where the material to be leached enters, reaction between this and the leaching solution (even though partially spent) will be most vigorous. Particularly in applications where metallic impurities are removed by leaching with acid, an exothermic reaction will often generate substantial heat. Therefore, cooling means such as water sprays 74 are provided to cool this portion of shell 10. On the other hand, in the upper portion of shell 10, fresh acid or leach solution is contacting material which is already almost fully leached. In order to promote efficient reaction to obtain best removal of residual leachables, heat may be required to be added at this stage. As shown in FIG. 1, heaters, such as gas burners 76, which may be supplied with natural or other combustible gas, are arranged to heat this upper portion of shell 10.

Referring now to FIG. 5, the shell and its contents are shown diagrammatically to illustrate the flows of material to be leached and the leach solution and rinse. As shown, the material to be leached is introduced into the lower end of shell 10, preferably into a compartment removed from the lower extremity as at 78. As the shell 10 revolves slowly the subdivided material to be leached is separated into separate portions by falling into the compartments between convolutions of spiral ribbon 72 and these are moved upwardly progressively through the compartments to be discharged at the upper end by lifters 58. It is advantageous to introduce the material to be leached into a compartment spaced from the lower extremity of said shell by at least one other such compartment, and such introduction of material to be leached may be made conveniently into the second to fifth compartment counted from the shell lower extremity. Under these conditions the bottom compartment or compartments act as a trap to catch fines of material to be leached which may be carried downward by the flow of leach solution. Such fines illustrated at 80 in FIG. 5 will thereby be recovered and admixed with material feed instead of being lost or requiring separate filtration or other specific recovery from spent leach solution.

Leach solution, as illustrated in FIG. 5, is introduced into the upper end of shell 10, preferably into a compartment spaced from the upper extremity of said shell. Rinse water is preferably introduced at the upper extremity, that is into the topmost compartment as at 82 where it will contact and finally rinse leached material as it is collected and lifted for discharge. Concentrated leach solution is introduced into a compartment spaced from the top, by at least one other such compartment so the leached material in the topmost compartment or compartments may be thoroughly washed with rinse water without further contact with leach solution. Introducing concentrated leach solution at this point is advantageous since it admixes with rinse water flowing down from the topmost compartment or compartments to form leach solution as at 84 of proper and desired strength for leaching during the final, intermediate and initial leaching stages. To effect this the rinse water is introduced into a compartment closer to the upper extremity of the tubular shell than the compartment into which the concentrated leach solution is introduced, and such compartment for concentrated leach solution introduction may conveniently be the second to sixth counted from the upper extremity of the tubular shell. Spent leaching solution overflows through the bottom outlet of shell 10 as at 86.

In FIG. 5 the spacing between convolutions of spiral ribbon 72 is shown as somewhat greater in the lower portion of the shell than in the upper portion thereof. In such embodiment the solution and material flows can be more clearly illustrated. In FIG. 6, however, the distances or spacings between convolutions of spiral ribbon 72 in shell 10 have been scaled to illustrate a specific embodiment wherein the distance between adjacent convolutions in the lower portion of shell 10 is from 2 to 4 times the distance between adjacent convolutions in the upper portion of shell 10. In FIG. 6 the distances between adjacent convolutions in the lower portion of shell 10 forming compartments 88 is scaled for 12 inches and between adjacent convolutions in the upper portion of shell 10 forming compartment 90 is scaled for 4 inches. Intermediate compartments 92, 94, 96, 98 and 100 are scaled for 10⅔ inches, 9⅓ inches, 8 inches, 6⅔ inches and 5⅓ inches respectively. Therefore it will be seen that the distance between the convolutions of spirial ribbon 72 in the lower portion of shell 10 is 3 times the distance between convolutions in the upper portion of shell 10, and in the intermediate transition zone between upper and lower portions the distances are intermediate and evenly graduated.

It will be understood that the ratios of liquid to solids are most easily compared (as for instance, when considering the relationship of such ratios in lower and upper portions of tubular shell 10) when the material to be leached or solids value is expressed as unity. For example, a liquid to solids ratio in a lower portion of shell 10 of 4 to 1 is readily recognizable as greater, and in fact, 4 times greater than a ratio of liquid to solids ratio of 1 to 1 in an upper portion of shell 10. The ratios as defined and within the limits specified according to this invention are ratios of parts by weight.

It will also be noted that increasing the width of compartments in a lower portion of shell 10 provides an increase in the total volume of liquid and solids which such compartments will hold. The increased volume, however, will be filled by an increase in the amount of leaching solution while the amount of subdivided material to be leached will remain uniform for each compartment throughout the length of shell 10 above the feed point. Since the solid amounts remain constant and the liquid proportion is increased, the variation in liquid to solids ratios will be somewhat greater than the variation in corresponding compartment width, particularly if liquid displacement by solids being leached is appreciable. To obtain improved operating efficiency, as hereinbefore described, the ratio should be greater in a lower portion of the tubular shell 10 than in an upper portion thereof and preferably 2 to 5 times greater. Less than twice will not ordinarily provide more than a minor variation in the ratios and more than 5 times will not ordinarily be useful due to the inordinately high proportion of liquid to solids in the lower portion of the shell 10 and corresponding concentrations of solids in liquid in the upper.

With a given feed of material to be leached and input of leaching solution, the leaching solution to material to be leached ratio will be dependent on the comparative volume of the compartments in shell 10 formed by adjacent convolutions of spiral ribbon 72. To provide difference in liquid to solids ratio with convenient mechanical constructions it is preferred that the distance between adjacent convolutions of spiral ribbon 72 in a lower portion of shell 10 be from 2 to 4 times the distance between adjacent convolutions in an upper part of shell 10.

The following example will illustrate the practice of this invention and operation of the apparatus hereinbefore described and illustrated.

Example I

This example will illustrate the leaching of chips of crude titanium sponge in apparatus of the type illustrated in FIGS. 1 to 6.

The crude titanium chips used as feed material for the leaching process are of size 5/16 inch by down and are composed of about 11% magnesium, 23% magnesium chloride, and the remainder sponge titanium metal. This feed material is typical of crude titanium produced by the so-called Kroll process, after being removed from the reduction reactor and ground to a suitable state of subdivision. The titanium chips are to be leached with an acid solution to dissolve and leach out the magnesium and magnesium chloride impurities. The acid leach solution comprises a mixture of hydrochloric and nitric acid, which is effective to dissolve both the metallic magnesium and the magnesium chloride without substantially increasing the hydrogen content of the titanium metal.

Leach apparatus of the general type illustrated in FIGS. 1 to 6 and described above is employed. The over-all length of the tubular shell 10 is 40 feet and its diameter 4 feet with a spiral ribbon 72 attached to its inner sidewall, leaving a 2 foot open central bore. At the lower end of the tubular shell, the distance between adjacent convolutions of the spiral ribbon as at 88 in FIG. 6 is 1 foot and this is reduced to 4 inches in the upper portion of the tubular shell as at 90 in FIG. 6. In a central portion of the shell intermediate these upper and lower portions the spacings are, respectively from lower to upper, 10⅔, 9⅓, 8, 6⅔ and 5⅓ inches to provide a transition zone, as in compartments 92 to 100 in FIG. 6. The shell is rotated at a speed of one turn in 3¾ minutes.

The titanium chips are transferred from storage hopper 46 into the input 44 of vibrating feeder 42 and are discharged from the open end of output conveyor 40 at a rate of 5 pounds per minute. The discharge of conveyor 40 will be arranged to supply a continuously falling stream of titanium chips into the compartment spaced by one from the lower extremity of shell 10 and the travel of the convolutions of ribbon 72 will cut off and separate the falling stream of titanium chips into uniform size portions in each compartment. Since the tubular shell 10 is rotating at a speed of one revolution every 3¾ minutes and the spacing between convolutions of ribbon 72 is 1 foot, rotation of shell 10 will separate the subdivided titanium chip feed material into uniform sized portions amounting to 18¾ pounds in each of the compartments as at 72 in FIG. 5.

As tubular shell 10 rotates, the portions in the compartments formed by the convolutions of ribbon 72 gradually move upwardly through shell 10 being finally at its upper extremity lifted up by lifters 58 and discharged into leached material collector 56.

At the same time, preheated rinse water is being introduced onto the sponge lifters through pipe 60 and controlled by its valve to provide a flow of 2.4 gallons a minute to thoroughly wash the leached titanium chips in the end compartment at the upper extremity of tubular shell 10. This rinse water overflows into each successively lower compartment formed by the convolutions of spiral ribbon 72. In the third compartment from the top of shell 10, the rinse water is mixed with concentrated acid solution introduced through pipeline 62, the flow therethrough being controlled by valve 64 so that the concentrated acid flow amounts to 0.62 gallon per minute. This concentrated acid flow is composed of 0.12 gallon of nitric acid and 0.5 gallon of hydrochloric acid proportionately admixed in supply tank 66.

The concentrated acid introduced from the end of pipe 62 mixes with the rinse water introduced through pipe 60 to provide a dilute leaching acid of about 9%–10% acid strength. This leaching solution flows downwardly as a net flow at the rate of 3 gallons per minute through the length of tubular shell 10 through each of the compartments formed by convolutions of spiral ribbon 72 overflowing progressively from one to the other end, finally being discharged, when spent, from extension 28 into funnel 36 to be carried away through pipe 38. Thus each portion of the titanium chip feed material is treated and leached successively and countercurrently in a plurality of stages as the portions of the titanium chip feed material in their upward travel contact the downwardly flowing acid leach solution. In the lower part of shell 10 the liquid to solids ratio will be about 10 (to 1) while in the upper portion of the shell 10, due to the closer spacing of the convolutions of spiral ribbon 72 and corresponding smaller size of the compartments in shell 10 bottom, the liquid to solids ratio will be about 3⅓ (to 1). Liquid to solids ratios will vary correspondingly according to convolution spacing in the intermediate transition zone. The effect in this example of liquid displacement by solids being leached is negligible.

In the upper portion of tubular shell 10, wherein the final stage of the leaching process is being accomplished, the leaching process has largely proceeded to near completion, and further reaction even with freshly constituted leaching solution is sluggish. Therefore, to promote more intense action during this later stage, heat is supplied to raise the temperature of the tubular shell contents, that is the material to be leached and its leaching solution, in this portion of shell 10. This is accomplished by operation of gas burners 76 to provide sufficient heat to maintain the shell 10 contents in their vicinity at from about 165° F. to 170° F. The increased temperature substantially increases the acid activity and contributes materially to efficiency of the leaching process.

In the lower portion of shell 10, wherein the initial stage of the leaching process is being accomplished, reaction between the material being leached and the leaching solution is much more intense. In this stage the titanium chips will be vigorously attacked by the leaching acid resulting in generation of heat and gas as well as bubbling and foaming. Temperature is maintained at this stage of the leaching process by application of cooling water to shell 10 by means of sprays 74, the amount being adjusted (by any valve or other conventional means) to result in a temperature of the shell 10 contents in this portion of between about 165° F.–170° F., that is about the same as in the upper portion. Thus the temperature is maintained essentially uniform over the length of shell 10, and during the initial and final leaching stages, in spite of the difference in reactivity and heat generation in the upper and lower portions.

During the leaching process suction fan 34 is operated to withdraw hydrogen generated by the leaching reaction through the end extension 28 of shell 10, and end housing 30 and duct 32. At the same time, blower 50 is operated to introduce air into the interior of shell 10 through pipe 48. Suction fan 34 has an effective capacity of 2200 cubic feet per minute and blower 50 has a capacity of 1980 cubic feet per minute. Introduction of air in this manner is effective to dilute gases such as hydrogen so that they may be safely exhausted, but the air input is sufficiently below the suction fan capacity so that inflow of the atmosphere will be obtained at the upper aperture 54 of shell 10 as well as at other openings and also gases generated by the leaching reaction will be effectively withdrawn. In this example the capacity of the blower 50 can be calculated as 87% of the capacity of suction fan 34.

Leached titanium chips from the material collector 56 after analysis show 0.35 to 0.45% magnesium and 0.1 to 0.15% magnesium chloride demonstrating efficient leaching action and acceptable purity in the product. The spent leaching acid discharged through the lower extremity of shell 10 and into pipe 38 through funnel 36 by analysis shows a pH between 6 and 3 demonstrating efficient usage of the acid values in the leaching solution, the spent solution being essentially neutral.

This invention provides efficient continuous leaching, and with effective utilization of a leaching solution. Temperature control as described provides a more or less uniform temperature during contact of material to be leached with nearly spent leaching solution in the initial stage of the leaching process as well as contact with fresh, strong leaching solution in the final stage. Gases generated during the leaching and produced as by-products of a leaching reaction can be withdrawn safely and efficiently as described without upsetting temperature or operating conditions.

The tubular shell for leaching, with its spiral ribbon arranged with convolutions spaced apart a greater distance in a lower portion than in an upper portion, provides advantageous control and difference in the liquid to solids ratios in an initial and a final stage of the leaching process.

In the initial stage a greater liquid to solids ratio is designed to provide:
 (a) a large heat sink;
 (b) a large shell surface area for external cooling;
 (c) sufficient liquid volume per compartment so liquid loss by foaming and frothing will have little effect on liquid to solids ratio.

In the final leaching stage less liquid to solid ratio is required because the leaching is nearly complete and less acid volume is required. The decreased volume of the compartment also increases the ratio of fresh acid reagent flow to compartment volume, thus providing a more efficient removal of reaction products prior to washing or rinsing residual leaching liquid from the leached product.

We claim:
1. Apparatus for countercurrent leaching comprising;
 (a) an elongated tubular shell rotatably supported with its longitudinal axis at an acute angle to the horizontal,
 (b) a continuous spiral ribbon having a plurality of convolutions fixed within said tubular shell, with the outer edges of said convolutions in sealing engagement with the interior wall of said tubular shell,
 (c) the distance between adjacent convolutions of said spiral ribbon in a lower portion of said tubular shell being greater than the distance between adjacent convolutions of said spiral ribbon in an upper portion of said tubular shell,
 (d) means for introducing a subdivided material to be leached into the lower end of said tubular shell and means for withdrawing leached material from the upper end of said tubular shell,
 (e) means for introducing leaching solution into the upper end of said tubular shell and means for withdrawing spent leaching solution from the lower end of said tubular shell,
 (f) means for rotating said tubular shell to impart conveying action of said spiral ribbon, and
 (g) heating means located adjacent said upper end of said tubular shell to increase the temperature of said leaching solution introduced at said upper end.

2. Apparatus according to claim 1 in which the distance between adjacent convolution of said spiral ribbon in a lower portion of said tubular shell is from 2 to 4 times the distance between adjacent convolutions of said spiral ribbon in an upper portion of said tubular shell.

3. Apparatus according to claim 1 in which the distance between adjacent convolutions of said spiral ribbon in a transition zone in said tubular shell between said upper and lower portions thereof is intermediate the distances between adjacent convolutions in the said upper and lower portions of said tubular shell.

4. Apparatus according to claim 1 in which the distances between plural adjacent convolutions of said spiral ribbon in a transition zone in said tubular shell between said upper and lower portions thereof are intermediate and graduated with respect to the distances between adjacent convolutions of said spiral ribbon in the said upper and lower portions of said tubular shell.

5. Apparatus according to claim 1 in which the means for introducing subdivided material to be leached into the lower end of said tubular shell comprises means for introducing said material to be leached into a compartment in the lower end of said tubular shell formed by adjacent convolutions of said spiral ribbon, said compartment being spaced from the lower extremity of said tubular shell by at least one other such compartment.

6. Apparatus according to claim 5 in which the compartment into which said subdivided material to be leached is introduced is from the second to the fifth of such compartments counted from the lower extremity of said tubular shell.

7. Apparatus according to claim 1 in which the means for introducing leaching solution into the upper end of said tubular shell comprises means for introducing said solution into a compartment in the upper end of said tubular shell formed by adjacent convolutions of said spiral ribbon, said compartment being spaced from the upper extremity of said tubular shell by at least one other such compartment.

8. Apparatus according to claim 7 in which the means for introducing leaching solution into the upper end of said tubular shell comprises means for introducing concentrated leaching solution into a compartment in the upper end of said tubular shell formed by adjacent convolutions of said spiral ribbon, said compartment being spaced from the upper extremity of said tubular shell by at least one other such compartment, and means for introducing a rinse liquid into a compartment in said tubular shell closer to the upper extremity thereof than the compartment into which said concentrated leaching solution is introduced.

9. Apparatus according to claim 7 in which the means for introducing leach solution into the upper end of said tubular shell comprises means for introducing concentrated leaching solution into a compartment in the upper end of said tubular shell formed by adjacent convolutions of said spiral ribbon, said compartment being from the second to the sixth of said compartments counted from the upper extremity of said tubular shell, and means for introducing water rinse into a compartment in said tubular shell closer to the upper extremity thereof than the compartment into which said concentrated leaching solution is introduced.

10. Apparatus for countercurrent leaching comprising;
    (a) an elongated tubular shell rotatably supported with its longitudinal axis at an acute angle to the horizontal,
    (b) a continuous spiral ribbon having a plurality of convolutions fixed within said tubular shell, with the outer edges of said convolutions in sealing engagement with the interior wall of said tubular shell,
    (c) the distance between adjacent convolutions of said spiral ribbon in a lower portion of said tubular shell being greater than the distance between adjacent convolutions of said spiral ribbon in an upper portion of said tubular shell,
    (d) a blower adapted to introduce air into said lower portion of said tubular shell and a suction fan adapted to withdraw gases from the lower end of said tubular shell including air introduced by said blower,
    (e) means for introducing subdivided material to be leached into the lower end of said tubular shell and means for withdrawing leached material from the upper end of said tubular shell,
    (f) means for introducing leaching solution into the upper end of said tubular shell and means for withdrawing spent leaching solution from the lower end of said tubular shell, and
    (g) means for rotating said tubular shell to impart conveying action to said spiral ribbon.

11. Apparatus according to claim 10 in which the capacity of said blower to introduce air into said tubular shell is from 70% to 95% of the capacity of said suction fan to withdraw gases therefrom.

References Cited

UNITED STATES PATENTS

| | | | |
|---|---|---|---|
| 1,084,980 | 1/1914 | Trump | 23—270 |
| 1,940,585 | 12/1933 | Fauth | 23—269 |
| 2,199,928 | 5/1940 | Van Wirt | 23—269 |
| 2,587,556 | 2/1952 | Weiss et al. | 23—270 |
| 3,117,031 | 1/1964 | Griffiths | 23—270 |

FOREIGN PATENTS

| | | |
|---|---|---|
| 223,112 | 6/1910 | Germany. |

NORMAN YUDKOFF, *Primary Examiner.*